United States Patent [19]

Heene et al.

[11] Patent Number: 4,802,119
[45] Date of Patent: Jan. 31, 1989

[54] SINGLE CHIP MICROCOMPUTER WITH PATCHING AND CONFIGURATION CONTROLLED BY ON-BOARD NON-VOLATILE MEMORY

[75] Inventors: Mark R. Heene, Austin, Tex.; Michael H. Menkedick, Kokomo, Ind.; James M. Sibigtroth, Round Rock; George L. Espinor, Austin, both of Tex.

[73] Assignees: Motorola, Inc., Schaumburg, Ill.; Delco Electronics Corporation, Kokomo, Ind.

[21] Appl. No.: 26,511

[22] Filed: Mar. 17, 1987

[51] Int. Cl.⁴ .............................................. G06F 9/00
[52] U.S. Cl. .................................................. 364/900
[58] Field of Search ... 364/200 MS File, 900 MS File

[56] References Cited

U.S. PATENT DOCUMENTS 4,542,453  9/1985  Patrick et al. ................. 364/200

*Primary Examiner*—Gareth D. Shaw
*Assistant Examiner*—John G. Mills
*Attorney, Agent, or Firm*—Jonathan P. Meyer

[57] ABSTRACT

A single chip microcomputer with patching and configuration is provided with blocks of patch memory which may be patched over faulty and/or obsolete areas of the microcomputer's memory map under control of starting address registers which are implemented in on-board non-volatile memory. The starting address registers, and enable registers which control whether each patch block is placed in the memory map, are programmable under control of the microcomputer's CPU. Newly programmed values in these registers are not effective to alter the memory map until a reset sequence enables a latch. In particular embodiments, patch blocks may overlie mask ROM, internal EPROM and/or EEPROM, external memory or devices or any other desireable portion of the memory map.

7 Claims, 5 Drawing Sheets

|        | BIT 7  |        |        |        |        |        |        | BIT 0  |       |
|--------|--------|--------|--------|--------|--------|--------|--------|--------|-------|
| PPROG  | ODD    | EVEN   | PASEL  | BYTE   | ROW    | ERASE  | EELAT  | EEPGM  | $_03B |
| INIT   | RAM3   | RAM2   | RAM1   | RAM0   | REG3   | REG2   | REG1   | REG0   | $_03D |
| CONFIG | PABL4E | PABL3E | PABL2E | PABL1E | NOSEC  | NOCOP  | ROMON  | EEON   | $_03F |
| PABL1  | PABL17 | PABL16 | PABL15 | PABL14 | PABL13 | PABL12 | PABL11 | PABL10 | $_035 |
| PABL2  | PABL27 | PABL26 | PABL25 | PABL24 | PABL23 | PABL22 | PABL21 | PABL20 | $_036 |
| PABL3  | PABL37 | PABL36 | PABL35 | PABL34 | PABL33 | PABL32 | PABL31 | PABL30 | $_037 |
| PABL4  | PABL47 | PABL46 | PABL45 | PABL44 | PABL43 | PABL42 | PABL41 | PABL40 | $_038 |

*FIG.3*

SINGLE CHIP MICROCOMPUTER WITH PATCHING AND CONFIGURATION CONTROLLED BY ON-BOARD NON-VOLATILE MEMORY

FIELD OF THE INVENTION

The present invention relates, in general, to a single chip microcomputer (MCU) with patching and configuration controlled by on-board non-volatile memory. More specifically, the invention relates to a single chip MCU having certain registers implemented in electrically erasable programmable read-only memory (EEPROM) which are effective during power-on reset to supply information necessary to properly configure the MCU and to map blocks of patch EEPROM into the memory map to replace defective or obsolete portions of mask read-only memory (mask ROM), internal EEPROM or other elements of the normal memory map of the MCU.

BACKGROUND OF THE INVENTION

Single-chip MCUs nearly always include some mask ROM, which is most typically used to contain critical interrupt and reset vectors and, in the case of custom MCUs, customer-supplied programs. Since, as the name implies, mask ROM is "programmed" when the masks used to fabricate the MCU are manufactured, errors in the manufacture of the masks and/or customer changes to the vectors or programs are extremely expensive to correct.

Other portions of the memory map of a single chip MCU may also be prone to expensive errors. For instance, many single chip MCUs include relatively large arrays of EEPROM and/or erasable programmable read-only memory (EPROM) which are subject to a relatively high probability of having one or more defectively manufactured locations.

Another aspect of single chip MCU operation is the need to configure the MCU to properly recognize its environment of both on-chip and off-chip peripherals and memory devices. This requires either software to continuously examine address outputs and to modify addresses to account for system configuration or some means to configure the MCU's memory map once, presumably at reset, with lasting results.

The need to patch defective or obsolete ROM by overlaying, or substituting, good memory locations is one which has long been recognized in the context of board-level memory products. For instance, U.S. Pat. No. 4,319,343 (filed July 16, 1980 and issued Mar. 9, 1982) describes a memory circuit which allows good memory to be patched over bad memory by means of programming, or setting, certain bits stored in a PROM. A portion of each address is input to the "trap" PROM, which simultaneously enables access to patch memory locations and disables the bad memory locations. The disclosed system, while suitable for a board-level memory system, is relatively too inflexible for application to an MCU, since the trap PROM is not electrically alterable and since the size of a patch block is the same as the capacity of a single memory chip. In addition, no means for implementing a patch scheme in an MCU-type environment is disclosed.

Another example of a memory patching scheme in the context of a board-level memory circuit is disclosed in U.S. Pat. No. 4,603,399 (filed Dec. 27, 1983 and issued July 29, 1986). The system disclosed substitutes certain locations in an EPROM for defective or obsolete locations in a ROM by means of a programmable logic array (PLA) which has been pre-programmed with information regarding defective or obsolete addresses. The patent discloses a means by which the size of each patch block may be efficiently varied by means of the programming of the PLA. Again, the disclosed system is effective for board-level memory products, but is not particularly suited for implementation in an MCU.

U.S. Pat. No. 4,610,000 (filed Oct. 23, 1984 and issued Sept. 2, 1986) discloses a scheme for patching a ROM which is integrated into a single package with a RAM. The system takes advantage of the fact that the control signals used to access the RAM are different from those used to access the ROM by dedicating a block of control logic to watch for addresses in the range dedicated to the ROM accompanied by control signals appropriate for RAM access. Under these conditions, the system accesses the patch ROM. This system is not useful in an MCU with a variable memory map, nor does it provide flexibility to re-configure a system such as an MCU to accommodate changing requirements.

SUMMARY OF THE INVENTION

Accordingly, it is an object of the present invention to provide a single chip MCU with patching and configuration controlled by non-volatile memory.

Another object of the present invention is to provide a single chip MCU in which the memory map is re-configured once at power-on reset and in which spare non-volatile memory blocks can be patched over other portions of the memory map during this re-configuration.

Yet another object of the present invention is to provide a method of patching and configuration under control of non-volatile memory in a single chip MCU.

These and other objects and advantages of the present invention are provided by a single chip microcomputer comprising a central processing unit adapted to serially execute a plurality of instructions; memory means for storing instructions and data for use by said central processing unit; patch memory means for selectably replacing at least one portion of said memory means; register means for storing at least one enable bit and at least one starting address indicating, respectively, whether said patch memory means is enabled and starting addresses of said at least one portion of said memory means, said register means being implemented in non-volatile memory; and programming means for programming said register means under control of said central processing unit.

BRIEF DESCRIPTION OF THE DRAWINGS

FIG. 3 is a diagram illustrating certain registers in a single chip MCU according to the principles of the present invention;

DETAILED DESCRIPTION OF THE INVENTION

The present invention is described below in the context of a single chip MCU which is commercially available from Motorola, Inc. and is designated the MC68HC11 (although no presently available version of this MCU implements the invention described). While the invention is described with detailed reference to this particular embodiment thereof, those skilled in the art will recognize that the principles of the invention are not limited to that particular MCU.

Figure 1:
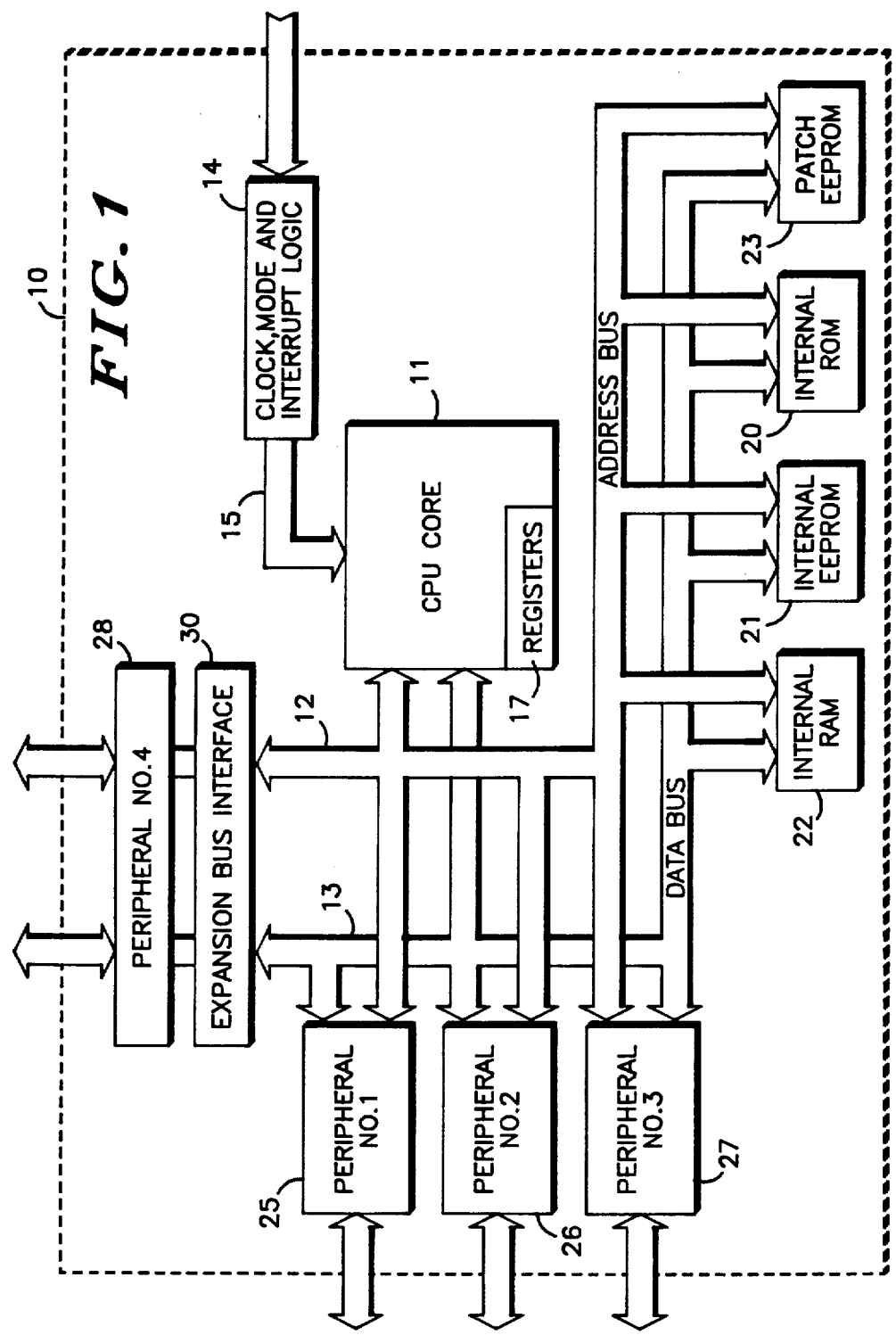
FIG. 1 is a block diagram illustrating the basic components of a single chip MCU according to the principles of the present invention.

FIG. 1 illustrates the basic architecture of a single chip MCU such as the MC68HC11. An MCU 10 comprises a central processing unit (CPU) core 11 which communicates over an internal address bus 12 and internal data bus 13 with various other portions of MCU 10. In addition, clock, mode and interrupt logic 14 receives external interrupt, timing and control signals from various pins and communicates with CPU core 11 over a control bus 15. In fact, while not shown here, all of the components of MCU 10 communicate with control bus 15.

CPU core 11 includes a number of registers 17 which are used to contain various status, control and other information, as is well understood. While registers 17 may be thought of as a part of CPU core 11, they are communicated with as if they were connected to address and data busses 12 and 13, respectively.

The internal memory components of MCU 10 include internal ROM 20 (mask ROM), internal EEPROM 21, internal RAM 22 and patch EEPROM 23, all of which communicate with internal address bus 12 and internal data bus 13.

MCU 10 includes four on-chip peripheral devices 25, 26, 27 and 28, respectively. Typical peripheral devices are timers, serial and parallel communication interfaces, A-D converters, and many others. The first three peripheral devices 25, 26 and 27, are directly connected to address bus 12 and data bus 13 and to pins for connection to off-chip systems. Fourth peripheral device 28 is connected to address bus 12 and data bus 13 through an expansion bus interface 30, which is directly connected to address bus 12 and data bus 13. Fourth peripheral device 28 is also connected to pins for connection to off-chip systems. This arrangement of expansion bus interface 30 and peripheral device 28, which is a feature of the MC68HC11, allows the pins to which peripheral 28 is connected to serve either as pure input/output pins or as address and data bus pins. In a single chip mode of operation, those pins are dedicated to peripheral 28 and no external address or data busses communicate with the MCU. In an expanded mode of operation, expansion bus interface 30 uses those pins to provide off-chip systems access to address bus 12 and data bus 13, thus expanding the amount of memory and/or off-chip peripheral devices which may be accessed by MCU 10.

Figure 2A:
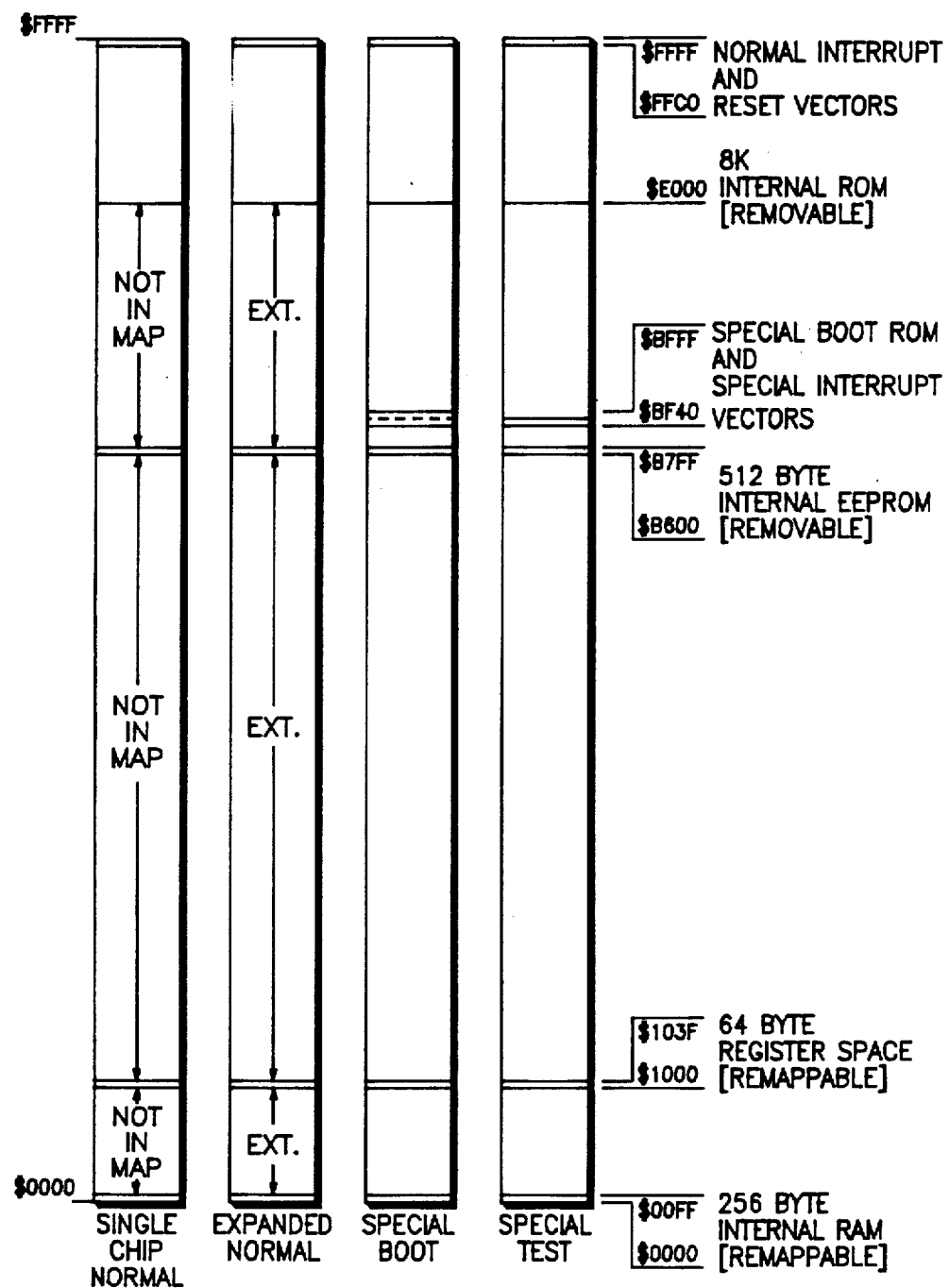
FIG. 2A is a diagram illustrating the normal memory map of a typical single chip MCU.

FIG. 2A illustrates the normal memory map of a particular version of the MC68HC11 (the A8 version). Flexibility of the memory map is a critical feature to allow the MCU to address as many markets as possible. Four modes of operation, each with a slightly different memory map, are accessible by the user of this MCU by means of the state of two input pins (which are connected to logic 14) at the time of a reset. The MCU utilizes 16-bit addresses, so has an address space ranging (in hexadecimal) from 0000 to FFFF. For the remainder of this description, any numeral preceded by a "$" will be assumed to be in hexadecimal form.

In a single chip normal mode of operation, addresses in the range of $0000 to $00FF access the 256 bytes of internal RAM of the MCU. As will be more apparent from the further discussion below, the internal RAM may be remapped to any 4K boundary. Addresses in the range of $1000 to $103F access the 64 bytes dedicated to registers 17. This address space may also be re-mapped to any 4K boundary. Addresses in the range of $B600 to $B7FF access the 512 bytes of EEPROM of the MCU. This block of EEPROM may be disabled, as will be explained below. Addresses in the range of $E000 to $FFFF access the 8K bytes of internal ROM of the MCU. Of this address space, the uppermost 64 bytes are dedicated to the interrupt and reset vectors upon which the MCU depends. All of the internal ROM is mask ROM. All addresses outside of the specified ranges are not in the memory map of the MCU in the single chip normal mode of operation.

The expanded normal mode of operation utilizes the same memory map as was just discussed with the exception that all addresses outside of the ranges discussed are assumed to be mapped to devices external to the MCU. Thus, when such an address is generated, the MCU expects a response through the expansion bus interface from some off-chip memory or peripheral device.

In a special boot mode of operation, the memory map is substantially the same as in the single chip, normal modes of operation except for locations in the range of $BF40 to $BFFF, which are mapped to a special boot loader ROM of 192 bytes which is located on-chip. In this mode of operation, the MCU comes out of reset and begins executing the boot loader routine, which loads a 256 byte program into the internal RAM via a serial communication port and then transfers control to that program. The interrupt and reset vectors used in this mode are located in the uppermost 64 bytes of the special boot ROM space. While the special boot mode is inherently a single chip mode of operation, certain control bits which are not normally user-accessible, including the mode control bits, are made accessible in this mode. This implies that the mode of operation can be changed from special boot to any other mode without going through a reset procedure.

Finally, a special test mode of operation is substantially identical to the normal, expanded mode of operation except that the reset vector and interrupt vectors are fetched from external locations in the range of $BFC0-$BFFF. In addition, access to normally inaccessible control bits, such as the mode control bits, is provided in special test mode.

Several causes may be responsible for the scrapping of an MCU such as has been described above. A prime cause is the obsolescence of the customer-supplied programs contained in the mask ROM. The inability to patch new memory over this area causes completed devices to be scrapped and requires the creation of a new mask layer at great expense. Another cause of scrap is the random failures which occur during the production of any array of ROM, EEPROM or EPROM, such as might be included in such an MCU.

Without the ability to patch over bad locations, such failures cause rejection of the entire MCU at test.

Figure 2B:
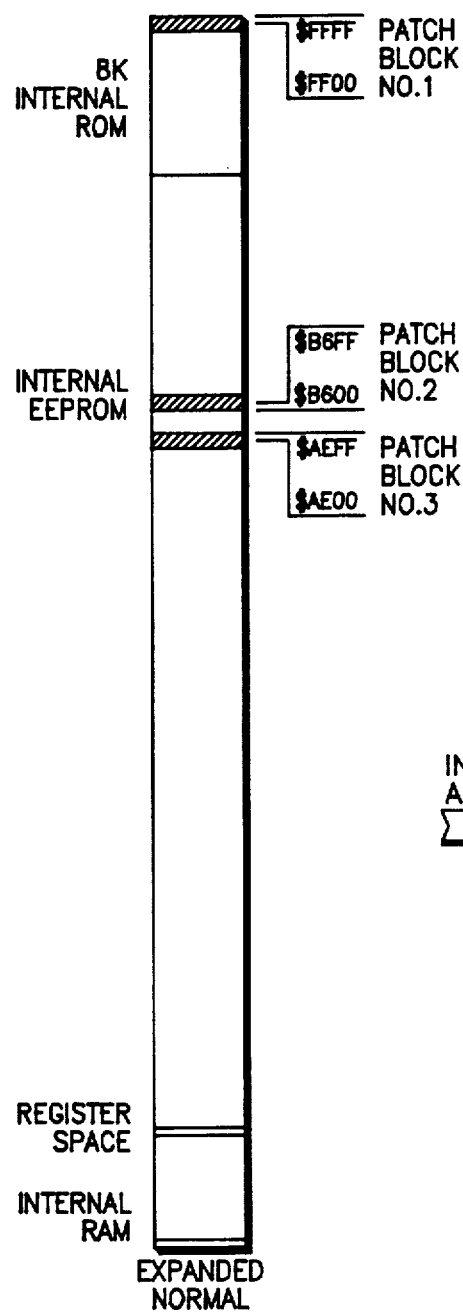
FIG. 2B is a diagram illustrating a portion of the memory map of a single chip MCU according to the principles of the present invention after patching has occurred.

FIG. 2B illustrates the memory map of an MCU similar to the above-described A8 version of the MC68HC11, except that patching according to the principles of the present invention is implemented and has been used to place three blocks of patch EEPROM over other portions of the memory map. For simplicity, only the expanded normal mode of operation is shown. In this emobidment of the invention, four patch blocks of 256 bytes each are assumed, each of which may be placed at any 256 byte boundary within the memory map. Patch block #1 has been placed in the address range of $FF00 to $FFFF, which overlies the portion of mask ROM containing the interrupt and reset vectors. The ability to bring the MCU up in special boot or test mode, in which the reset and interrupt vectors are fetched from locations other than $FFC0-$FFFF, allows even these critical locations to be patched, as will be more apparent from the discussion below. Patch block #2 has been placed over address range $B600 to B6FF, which contained the lower half of the normal internal EEPROM. This illustrates the ability to use this patching technique as a redundancy scheme for other non-volatile memory on the MCU. Patch block #3 has been placed in address range $AE00 to $AEFF, which might contain, for instance, an external ROM which required patching. Patch block #4 has not been placed and so is not a portion of the memory map of this particular part.

FIG. 3 illustrates a number of registers which are necessary for an understanding of the principles of the present invention. Each register is an 8-bit storage location accessible at the address specified on the right-hand side of the diagram. The registers are referred to by the mnemonics PPROG, INIT and CONFIG are standard registers of the MC68HC11, although the illustrated use of the upper four bits of CONFIG is different from commercially available versions. The registers referred to by the mnemonics PABL1, PABL2, PABL3 and PABL4 are not included in commercially available versions of the MCU at present. These registers contain the information necessary to place the four patch blocks, respectively. Advantageously, these four registers would not be included in the normal memory map of the MCU, but would appear only when the MCU is in special boot or special test mode. In addition, it would be preferred that a control bit, as described below, would selectably remove the registers from the memory map even during special modes, to provide protection from inadvertant changes thereto.

The register PPROG contains bits necessary to enable programming and erasing of any on-chip EEPROM, including the patch blocks and the EEPROM locations which hold the information in the patch block registers, as is discussed below. In the illustrated case, bit 5 of PPROG, PASEL, controls whether the patch block registers appear in the memory map of the MCU during special modes, as described above. Bit 2 of PPROG enables erasure of on-chip EEPROM, with bits 3 and 4 determining whether row or byte erase is executed. Bit 1 of PPROG determines whether EEPROM latches are currently configured for reading or programming. Bit 0 of PPROG determines whether programming is currently enabled.

The register INIT contains two 4-bit words which determine, respectively, the starting addresses of the 256 byte internal RAM and the 64 byte register space. (Note that the address of each of the registers of FIG. 3 has an indeterminate first hex digit.) The upper four bits of INIT specify the starting address of the internal RAM and the lower four bits determine the starting address of the register space. This implies that either of these blocks of memory may be placed on any 4K boundary within the memory map. Again, this is a standard feature of the commercially available MC68HC11.

The lower half of the register CONFIG contains four bits which enable/disable certain optional features of the MCU. Bit 3, NOSEC, disables a security feature, if set. Bit 2, NOCOP, disables a watchdog timer, if set. Bit 1 enables access to the internal ROM, if set. Bit 0 enables access to the internal EEPROM, if set. The upper half of CONFIG, which is not utilized in some commercial versions of the MCU, is used here to contain bits referred to mnemonically as PABL1E, PABL2E, PABL3E and PABL4E, respectively. These bits, if set, enable the placement of each of the four patch blocks, respectively, at the locations specified by the addresses contained in the registers PABL1-PABL4.

The registers PABL1-PABL4, which are not shown here at addresses not used for user-accessible registers in commercially available MC68HC11's, each contain a 8-bit address which specifies the starting location at which the corresponding patch block is to be placed.

In order to implement the patching illustrated with reference to FIG. 2B, the registers described must be set to the following values: INIT must be 00000001 ($01); CONFIG must be 0111_11; PABL1 must be 11111111 ($FF); PABL2 must be 10110110 ($B6); PABL3 must be 10101110 ($AE); and PABL4 is not constrained. The specified value for INIT, which is the default value in commercially available parts, places the internal RAM and the register space at the locations specified with reference to FIG. 2A. The value set forth for CONFIG enables placement of patch blocks 1-3 and disables patch block 4 (the upper four bits) and enables both internal ROM and internal EEPROM (the lower two bits). The value specified for registers PABL1-PABL3 are simply the starting addresses of patch blocks 1-3, respectively. Since patch block 4 is disabled, the contents of PABL 4 have no effect.

Of course, the particular patching described is merely exemplary.

Figure 4:
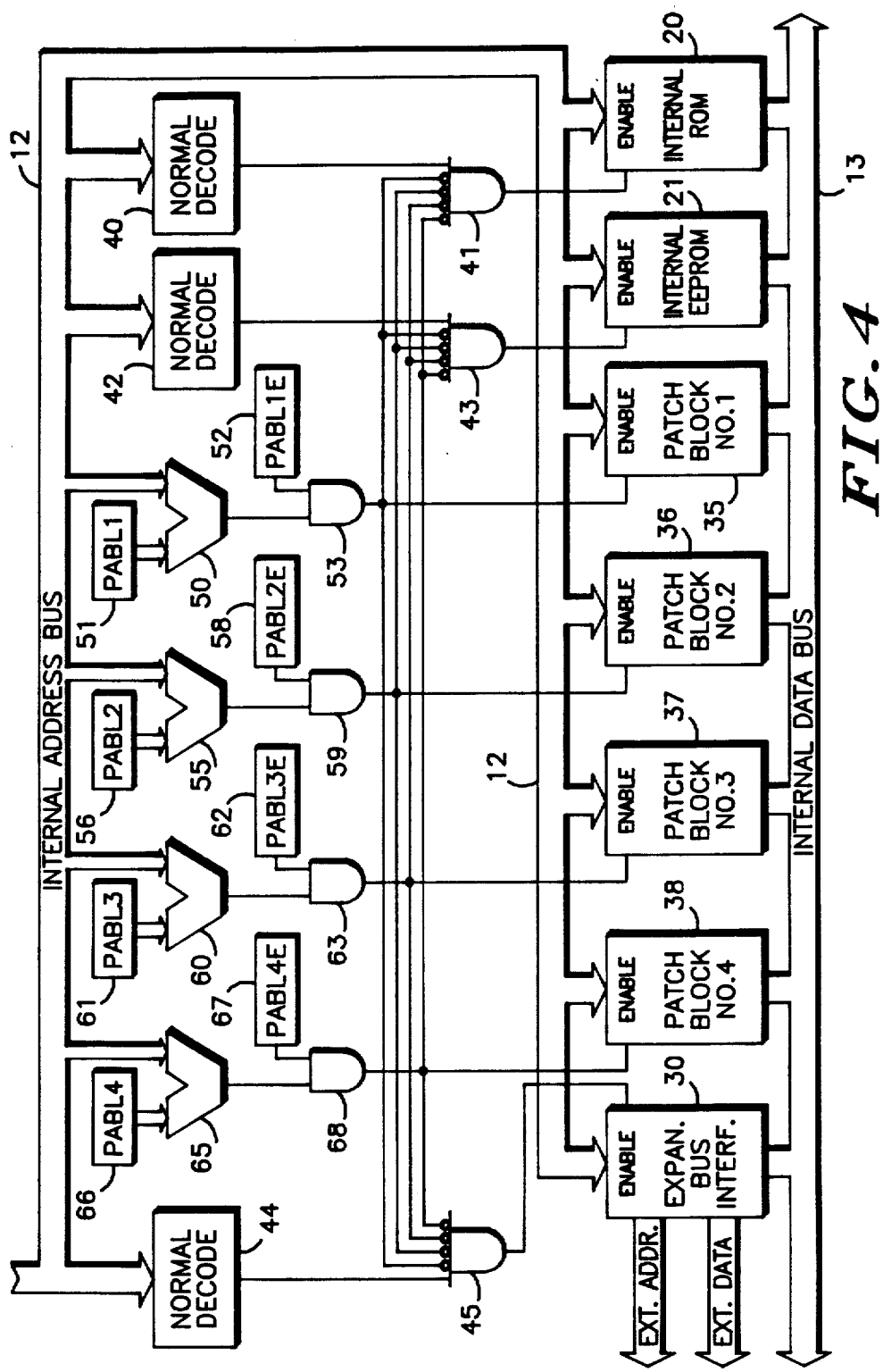
FIG. 4 is a block diagram illustrating a portion of a single chip MCU according to the principles of the present invention.

FIG. 4 illustrates an apparatus suitable for implementing the patching scheme described. Internal ROM 20, internal EEPROM 21 and expansion bus interface 30 all receive addresses from internal address bus 12 and place data on internal data bus 13 in response thereto. In addition, each of ROM 20, EEPROM 21 and interface 30 has an enable input which enables that block to respond to addresses on address bus 12. Also receiving inputs from address bus 12 and placing outputs on data bus 13 are patch blocks 1-4, 35-38, respectively. Each patch block 35-38 also has an enable input. As is familiar, each item which responds to addresses on address bus 12 actually responds to a number of address bits corresponding to the number of locations addressable in that item. For instance, internal ROM 20, in the example being described, has 8K locations and so responds to the lower 13 bits on address bus 12. ($2^{13}$ equals 8192.)

The upper 3 bits on address bus 12 are input to normal decode logic 40, which outputs an enable signal if all three bits are set (logic 1). The output of normal decode logic 40 is connected to a non-inverted input of AND gate 41, the output of which is connected to the enable input of internal ROM 20.

Similarly, internal EEPROM 21, which is 512 bytes deep, responds to the lower 9 bits of address bus 12. The upper 7 bits are input to normal decode logic 42, the output of which is connected to a non-inverting input of AND gate 43, the output of which is connected to the enable input of internal EEPROM 21. Expansion bus interface 30 receives all 16 bits from address bus 30, since it is necessary that all addresses in the MCU's range be available on the external busses. Normal decode logic 44 also examines all address bits and produces an enable signal when an address currently mapped to an external device is present. This output is connected to a non-inverting input of AND gate 45, the output of which is connected to the enable input of interface 30.

A first 8-bit comparator 50 has one input connected to address bus 12 to receive the 8 most significant bits of the address thereon and another input connected to register PABL1 51. Thus, when the upper 8 bits of the current address on bus 12 match the starting address for patch block 1 stored in PABL1, comparator 50 produces an active output. This output is connected to an input of AND gate 53. Another input of AND gate 53 is connected to PABL1E 52 (bit 4 of CONFIG). The output of AND gate 53 is connected to the enable input of patch block 1 and also to inverting inputs of AND gates 41, 43 and 45. Thus, if the current address on bus 12 matches the pre-selected starting address for patch block 1, and if the enable bit for patch block 1 in CONFIG is set, patch block 1 is enabled and internal ROM 20, internal EEPROM 21 and expansion bus interface 30 are disabled.

The arrangement for enabling patch block 2 and disabling the other devices is similar, involving 8 bit comparator 55, register PABL2 56, PABL2E 58 and AND gate 58. Similarly, the arrangement for patch block 3 involves 8-bit comparator 60, register PABL3 61, PABL3E 62 and AND gate 63. Finally, the enable arrangement for patch block 4 involves 8-bit comparator 65, register PABL4 66, PABL4E 67 and AND gate 68.

The apparatus of FIG. 4, which is just one of many which could be designed to implement the patching scheme of the present invention, provides the ability to place four patch blocks over internal ROM, internal EEPROM or any external address at any 256 byte boundary in the memory map. While it is not required to be so, it will be assumed that each patch block is 256 bytes deep. As will be apparent to one skilled in the art, a number of assumptions and design choices are inherent in the apparatus of FIG. 4, but are not necessarily the best choices and assumptions for any particular system.

For instance, any patching scheme according to the principles of the present invention must chose an appropriate size for each patch block. The smallest possible patch block size will normally be determined by the organization of the EEPROM memory used for patching. It may be, for instance, a single row or even one-half row of EEPROM cells (say, 32 or 16 bytes). Choosing a small patch block size provides great flexibility in patching small regions of defective or obsolete memory, but exacts penalties in that patching larger blocks of memory requires many patch blocks. The number of patch block registers required increases and each patch block register specifying a starting address must be longer.

Choosing a relatively large patch block size, such as is illustrated here, conserves register space in both the length and number of patch block registers, but may require patching many good memory locations to repair a few bad ones. The choice of patch block size will be made in each case in view of the number of and probable size of expected locations to be patched and the register space available.

Another assumption inherent in FIG. 4 is that only internal ROM, internal EEPROM and external addresses may require patching. While one would not usually wish to patch defective RAM with EEPROM, it is possible to conceive of situations in which certain parameters stored initially in RAM (for instance, while their values are changing frequently), could be overlaid with EEPROM (for instance, after their values settle) to avoid the necessity of refreshing and re-writing those values. In addition, there is no reason that the principles of the present invention could not be extended to involve blocks of patch RAM available to repair defective locations in internal or external RAM.

Yet another assumption inherent in the apparatus shown in FIG. 4 is that the enable bit and starting address for each patch block are stored in different registers. While this is a convenient arrangement for the case illustrated, there is no reason, for instance, that the enable bit could not be one bit (say, the highest order bit) in the register containing the starting address, with suitable modifications to the comparison logic of FIG. 4. Many other arrangements are also possible, depending on the available register space, the length of each starting address and other factors.

Figure 5:
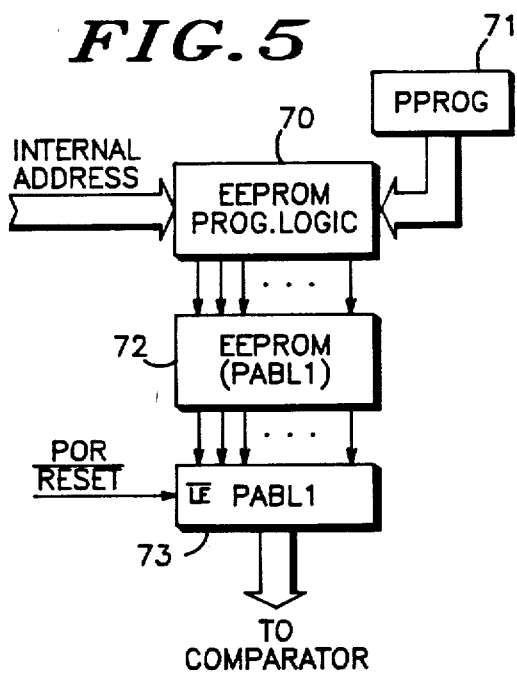
FIG. 5 is a block diagram illustrating a portion of a single chip MCU according to the principles of the present invention.

FIG. 5 illustrates the apparatus used to implement each of the patch block registers (PABL1-PABL4) according to a preferred embodiment of the present invention. EEPROM programming (and erasing) logic 70 is a standard portion of an MCU such as the MC68HC11 which has on-chip EEPROM and is capable of self-controlled programming and erasing. As was mentioned above, logic 70 is controlled, in part, by the states of several bits in register PPROG 71. Logic 70 also responds to internal address bus 12 to determine which memory locations are to programmed (or erased). A block 72 of EEPROM cells, equal in number to the number of bits in each patch block (in this example, 8) is programmed by the MCU user, by means of logic 70, to contain the starting address for a particular patch block. Each patch block register has a separate block of EEPROM cells. In addition, in the example described, the appropriate enable bit in CONFIG is set. As it turns out, CONFIG on the MC68HC11 is implemented in EEPROM cells in a similar fashion. A latch 73 has the same number of bit locations as does EEPROM 72 and is connected to the outputs thereof. A latch enable input of latch 73 is an active low input which causes latch 73 to capture its current inputs and to hold those values until a new, active low latch enable signal is present. The MCU's power-on reset signal, POR RESET, which is also active low, is connected to the latch enable input of latch 73. Obviously, latch 73 will hold its contents as long as the MCU has power, so it is not necessary to re-load it from EEPROM 72 on resets other than power-on resets.

The output of latch 73 is connected to the appropriate comparator as described above. Since the enable bits in CONFIG are also stored in EEPROM, the entire patching scheme need only be programmed once. However, it may be reprogrammed to change the allocation and mapping of the patch blocks simply by reprogramming the appropriate EEPROM registers. The fact that the newly programmed values are not effective until the next power-on reset prevents reprogramming from upsetting the operation of the MCU. Besides the facte that the appropriate bits of PPROG must be properly set to erase or program those registers effecting the patching scheme, it is possible to condition access to those registers on certain bits which may only be set when the MCU is in either special boot or special test mode, thus preventing a casual but clumsy or malicious user from altering the predetermined patching allocations.

It is useful, when implementing a patching scheme such as is described above, to improve the testability of the MCU by allowing direct write access to latch 73, in the case illustrated above, when the device is in special test mode. This may be readily accomplished with routine modifications to the logic shown. This allows a test routine to more quickly exercise the patching scheme than would be the case if such direct write access were not provided.

The preceding description of the present invention involves a patching scheme in which patch blocks of predetermined size are placed at fixed locations in the memory map as determined by starting addresses stored in certain registers. One possible modification to this may be thought of as "relative patching". In this case, a patch block would be placed over a specific block of memory, say internal EEPROM, and would "follow" that target block of memory even if it were re-mapped to some other location. This could be accomplished by a mechanism which examines the output of the normal decode logic and selects the patch memory whenever the target memory is selected. The starting address of the patch block would be specified relative to the start of the target memory. This would normally require fewer bits to specify the starting address than would be required in the embodiment described above. The present invention provides a patching and configuration scheme which is suited for implementation in a single chip MCU. Means are provided to control patching and configuration with on-board non-volatile memory, but still allow the controlling memory locations to be reprogrammed. The use of erasable, programmable non-volatile memory to contain the information necessary to enable and map the patch blocks provides ease of use and flexibility.

While the present invention has been described with reference to a particular embodiment thereof, those skilled in the art will appreciate that many modifications and changes thereto are possible and are within the spirit and scope of the present invention.

We claim:

1. A single chip microcomputer comprising:
   a central processing unit adapted to serially execute a plurality of instructions;
   an internal address bus connected to said central processing unit;
   an internal data bus connected to said central processing unit;
   at least one memory block coupled to said internal address and data busses;
   at least one patch memory block connected to said internal address and data busses
   decode means connected to said internal address bus for examining a portion of an address thereon and responding thereto by enabling an indicated one of said at least one memory block;
   at least one register means for containing at least one starting address of said at least one patch memory block;
   patch means connected to said internal address bus and to said at least one register means for comparing a portion of an address on said address bus and said at least one starting address and for responding thereto by enabling said at least one patch block and disabling said indicated one of said at least one memory block.

2. A single chip microcomputer according to claim 1 further comprising:
   register means for containing enable indicators for each of said at least one patch memory blocks, said patch means further being responsive to said enable indicators.

3. A single chip microcomputer according to claim 2 further comprising:
   expansion means connected to said internal address and data busses for selectably extending said busses off said single chip, said patch means further being capable of selectably disabling said expansion means.

4. A single chip microcomputer according to claim 1 further comprising:
   programming means for programming said at least one register means under control of said central processing unit.

5. In a single chip microcomputer comprising a central processing unit for serially executing a plurality of instructions, an internal address bus connected to said central processing unit, an internal data bus connected to said central processing unit, and at least one other device connected to said internal address and data busses, said at least one other device being selected in response to a portion of an address on said data bus, the improvement comprising:
   at least one block of patch memory connected to said internal address and data busses;
   patch means connected to said internal address bus for responding to a portion of an address thereon according to pre-determined criteria by selecting at least one of said patch memory blocks and by deselecting said at least one other device, said patch means comprising non-volatile memory means for storing said pre-selected criteria; and
   programming means for programming said non-volatile memory under control of said central processing unit.

6. A single chip microcomputer according to claim 5 wherein said patch means further comprises:
   for each said at least one patch block: a latch responsive to a reset signal, a non-volatile memory register storing at least a starting address and providing inputs to said latch, and a comparator having one set of inputs connected to outputs of said latch and another set of inputs connected to a portion of said internal address bus.

7. A single chip microcomputer according to claim 6 wherein said patch means further comprises:
   non-volatile memory means for storing an enable indicator for each said at least one patch block, said patch means being responsive to said enable indicator to selectably enable said at least one patch block.

* * * * *